United States Patent [19]

Ito et al.

[11] Patent Number: 5,090,001
[45] Date of Patent: Feb. 18, 1992

[54] INFORMATION RECORDING/REPRODUCING APPARATUS

[75] Inventors: Kenichi Ito; Masatoshi Kobayashi, both of Hachioji, Japan

[73] Assignee: Olympus Optical Co., Ltd., Tokyo, Japan

[21] Appl. No.: 360,425

[22] Filed: Jun. 1, 1989

[30] Foreign Application Priority Data

| | | |
|---|---|---|
| Jun. 6, 1988 [JP] | Japan | 63-139093 |
| Jul. 28, 1988 [JP] | Japan | 63-186986 |
| Aug. 12, 1988 [JP] | Japan | 63-201146 |

[51] Int. Cl.⁵ .............................................. G11B 7/00
[52] U.S. Cl. ............................... 369/44.28; 369/44.27; 369/44.29; 369/32
[58] Field of Search ............... 369/44.27, 44.28, 44.29, 369/44.32, 32

[56] References Cited

U.S. PATENT DOCUMENTS

| | | | |
|---|---|---|---|
| 4,476,555 | 10/1984 | Joichi et al. | 369/44.32 |
| 4,607,358 | 8/1986 | Maeda et al. | 369/44.28 |
| 4,615,023 | 9/1986 | Inada et al. | 369/32 |
| 4,707,817 | 11/1987 | Yoshio | 369/44.32 |
| 4,866,687 | 9/1989 | Kasai et al. | 369/32 |

FOREIGN PATENT DOCUMENTS

| | | |
|---|---|---|
| 61-267976 | 11/1986 | Japan . |
| 61-280080 | 12/1986 | Japan . |
| 62-164226 | 7/1987 | Japan . |

OTHER PUBLICATIONS

Y. Ozawa et al.—Theoretical Analysis of Dual Tracking Servo System, Fujitsu Laboratories Ltd., pp. 195-202.

Primary Examiner—Roy N. Envall, Jr.
Assistant Examiner—Hindi Nabil
Attorney, Agent, or Firm—Frishauf, Holtz, Goodman & Woodward

[57] ABSTRACT

An information recording/reproducing apparatus includes an optical head for projecting a light spot onto an optical disk, a fine actuator for causing a light spot to track a track of the optical disk, a coarse actuator for moving the light spot over a recording region of the optical disk, a movement detector for detecting a moving distance of the fine actuator and outputting a detection signal, and a driving circuit for adding the output signal from the movement detector and a drive signal for driving the fine actuator and forming a drive signal for driving the coarse actuator on the basis of the sum signal.

20 Claims, 11 Drawing Sheets

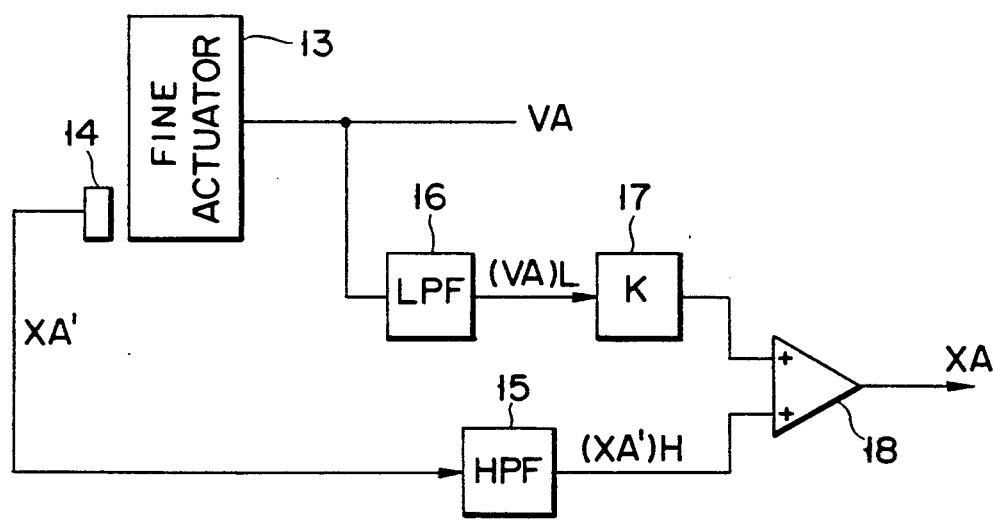
F I G. 1
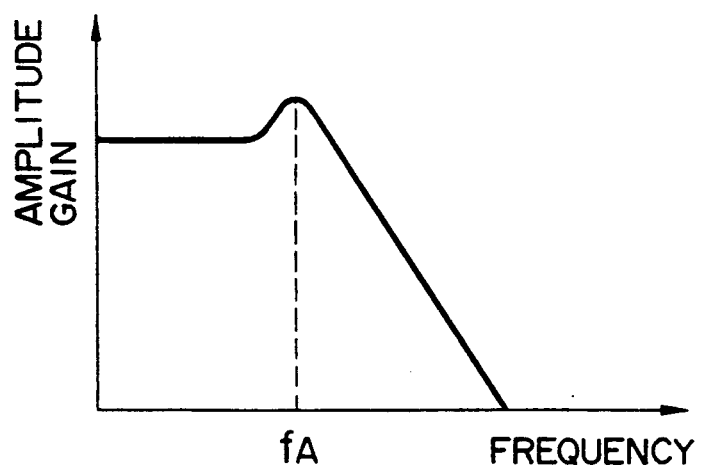
F I G. 2

F I G. 4A
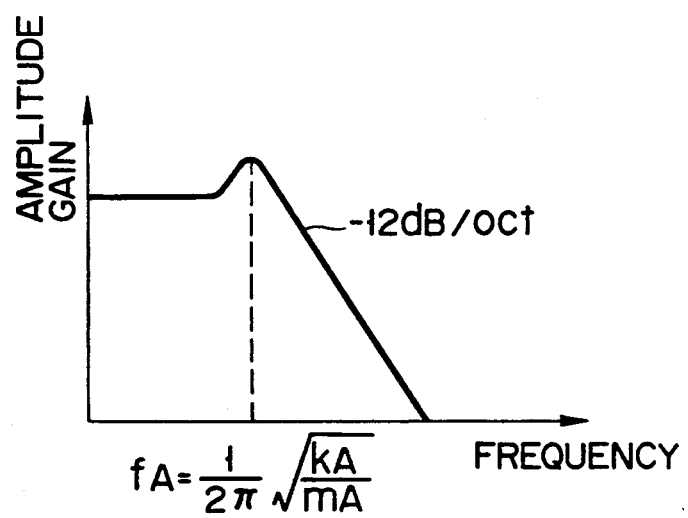
F I G. 4B
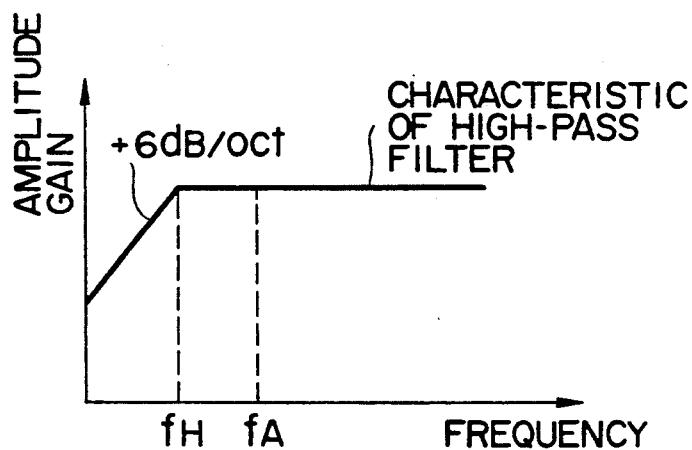
F I G. 4C
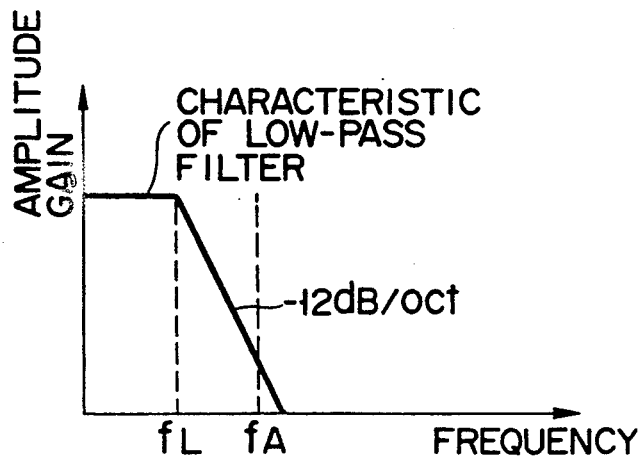

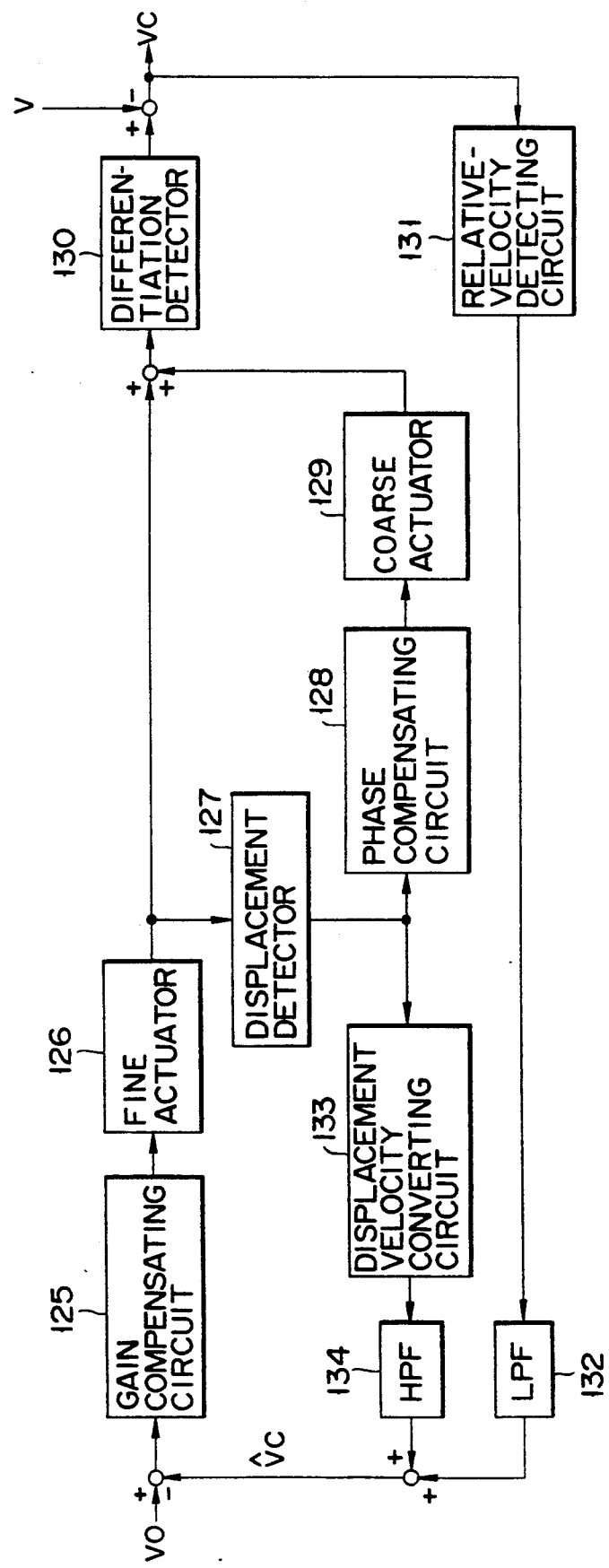
F I G. 6

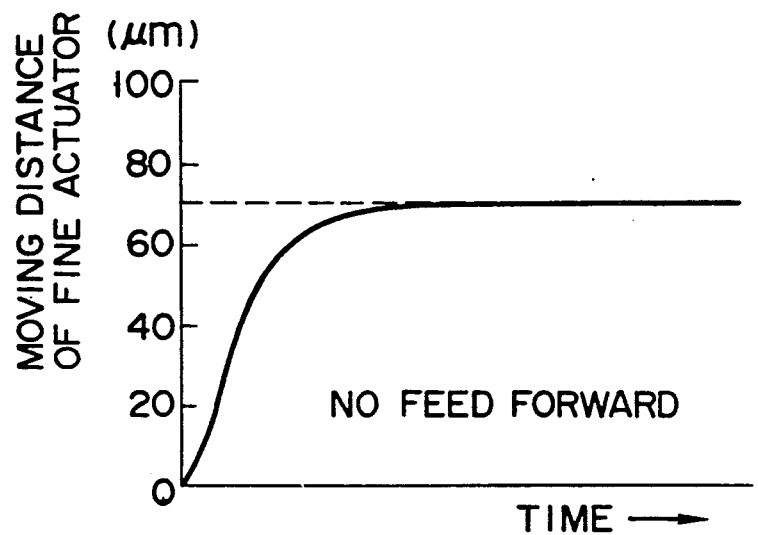
F I G. 11A
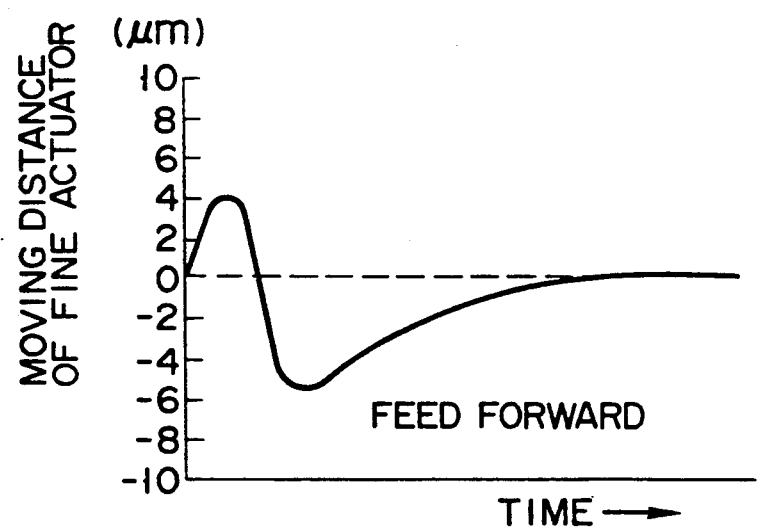
F I G. 11B

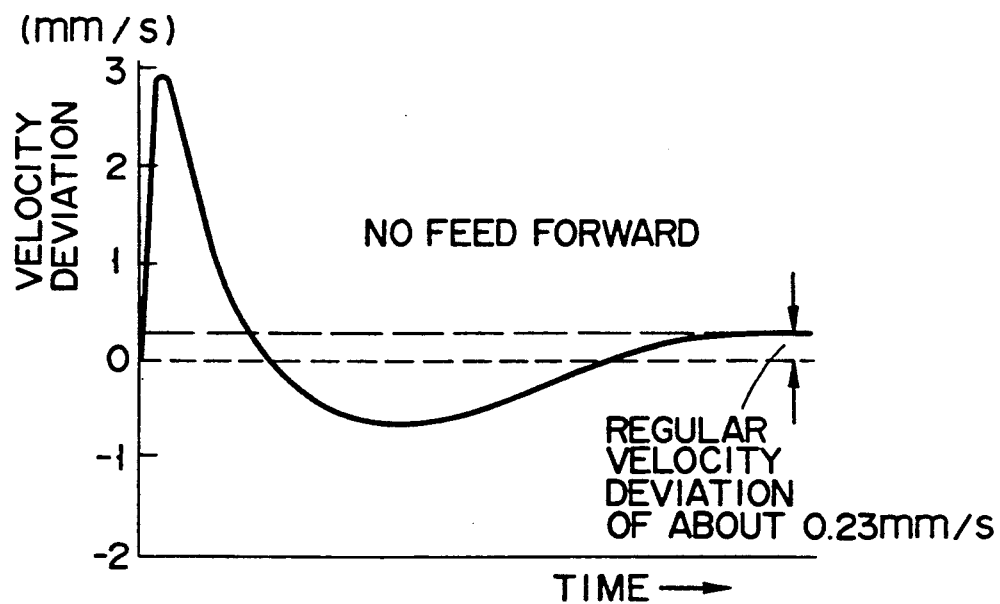
F I G. 12A
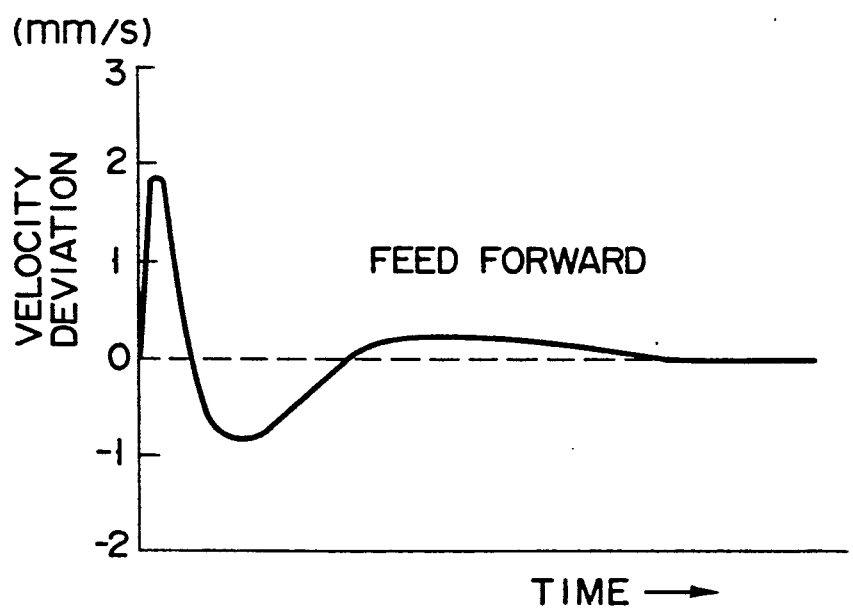
F I G. 12B

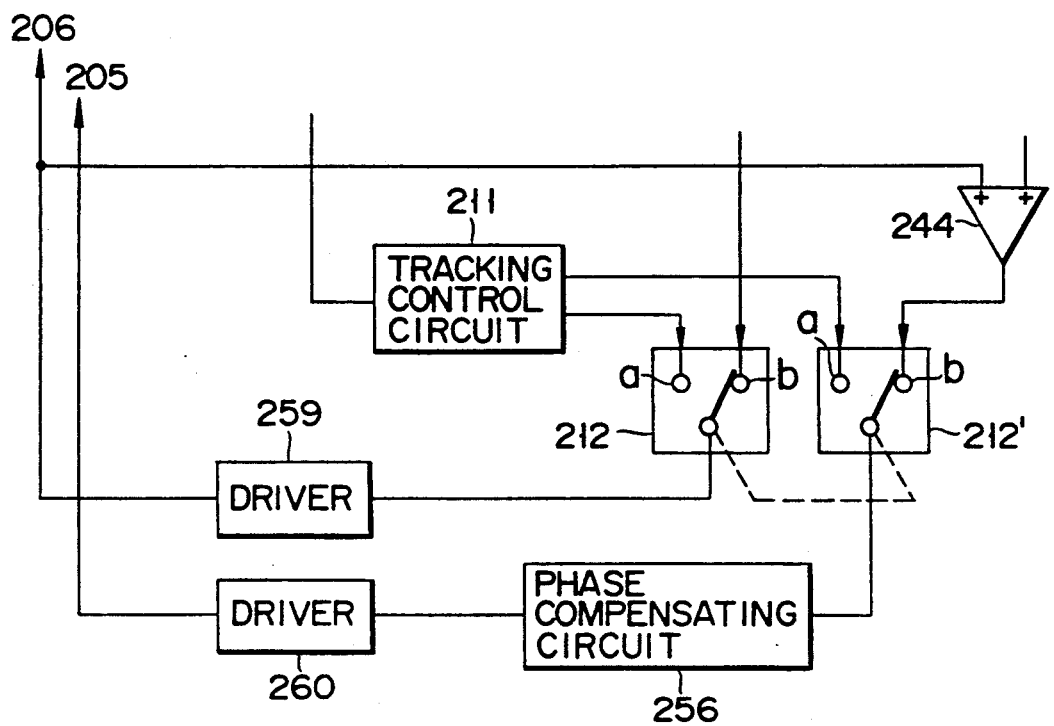
F I G. 13
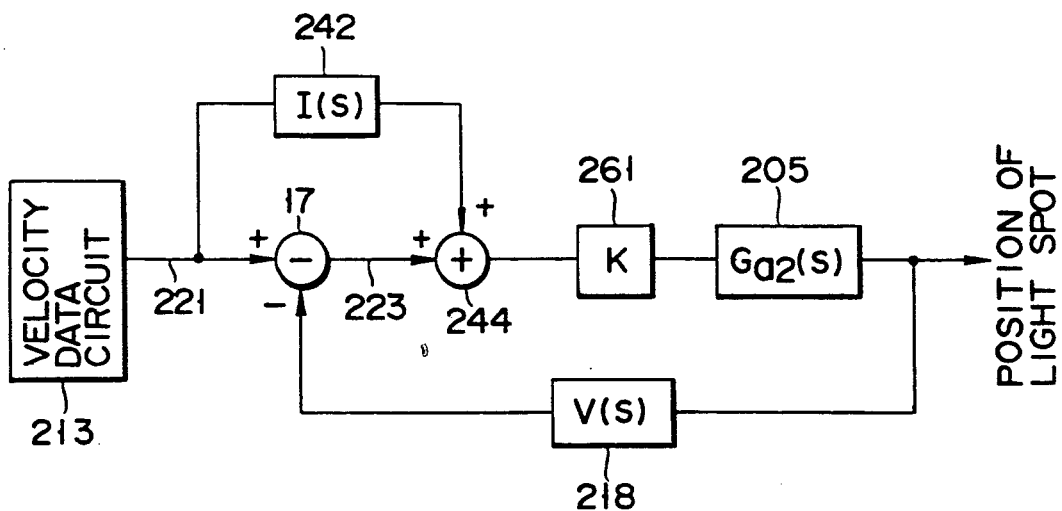
F I G. 14

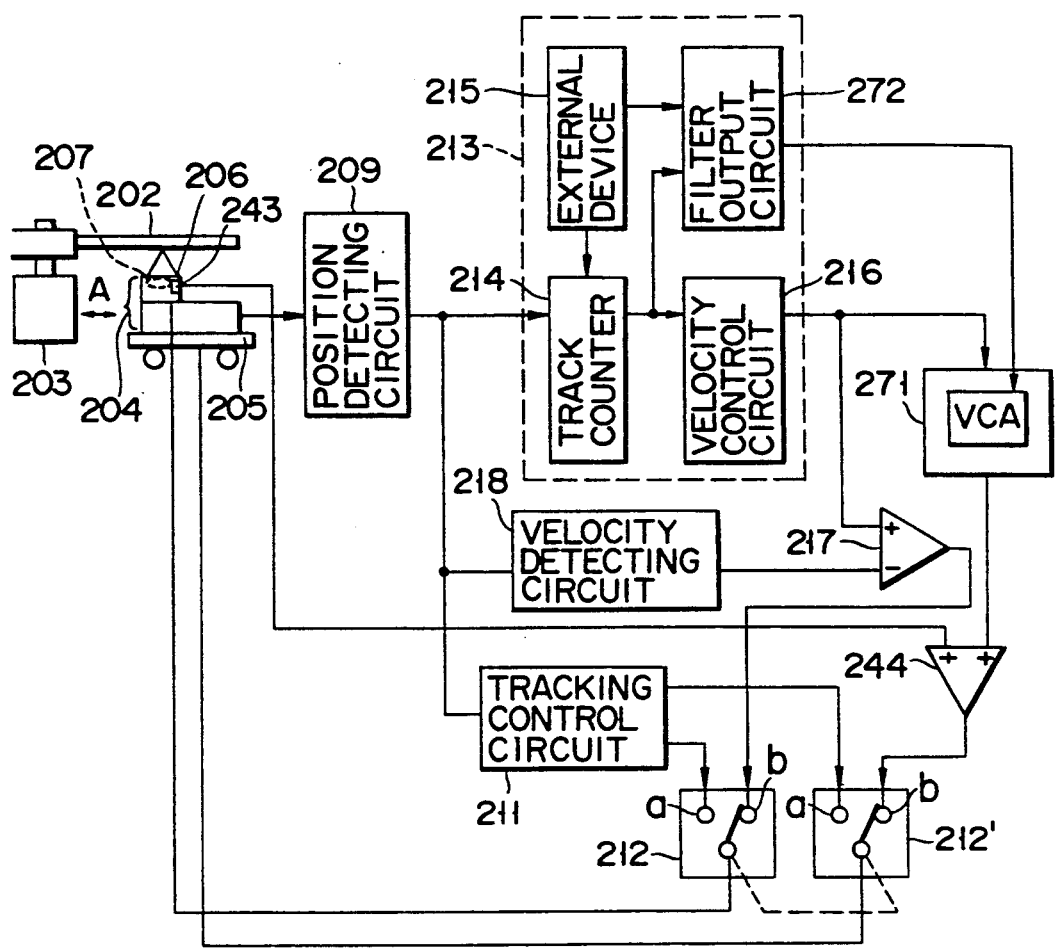
F I G. 16
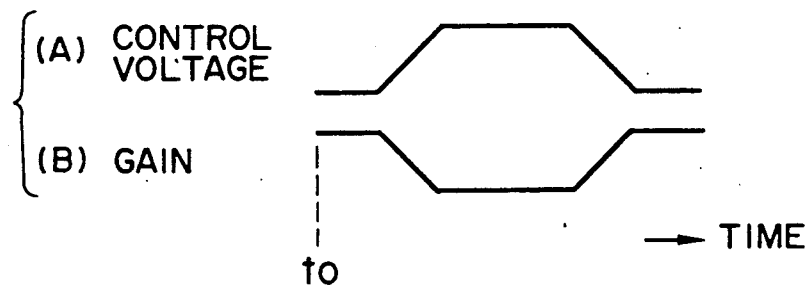
F I G. 17

INFORMATION RECORDING/REPRODUCING APPARATUS

BACKGROUND OF THE INVENTION

1. Field of the Invention

The present invention relates to an apparatus for recording/reproducing information on/from an optical recording medium.

2. Description of the Related Art

In recent years, an optical recording/reproducing apparatus which can record information at a high density using a light beam or can reproduce information recorded at a high density at high speed has been developed in place of an apparatus for recording/reproducing information using a magnetic head.

According to the optical recording/reproducing apparatus, a track spirally or concentrically formed on a disk-like recording medium (to be referred to as an optical disk hereinafter) at small intervals of $1\mu$ to $2\mu$ is tracked by a beam spot of a light beam. In order to realize high-density/high-speed recording/reproduction, a tracking actuator having high tracking performance with respect to a high frequency and a linear motor for moving an optical head from an inner periphery to an outer periphery of an optical disk in a low-frequency region are simultaneously operated.

The papers of Optical Disk Symposium '85 report the following optical recording/reproducing apparatus.

More specifically, a displacement of a tracking actuator is directly detected by a detection sensor, and the detection sensor outputs a detection signal. The detection signal is subjected to signal processing by a phase compensating circuit and a driving circuit to be converted to a drive signal and supplied to a linear motor.

Based on the drive signal, the tracking actuator and the linear motor are simultaneously operated.

According to the conventional optical recording/reproducing apparatus, if an environmental condition is changed, an actual displacement of the tracking actuator operated under the changed condition is detected by a displacement detection sensor. Therefore, the characteristic of the tracking actuator and an inertia force acting on the tracking actuator are included in the detected displacement as information. In this case, an equivalent circuit on the basis of each tracking actuator and an inertia force correcting circuit need not be adjusted, and there is no problem of an error caused by a change in environment such as a change in temperature. However, the displacement detection sensor of the tracking actuator must be arranged so that a zero point of the displacement of the tracking actuator coincides with a zero point of the sensor output. For this reason, it is difficult to improve mounting precision of the displacement detection sensor, and a mounting position includes an error. Therefore, the displacement detection sensor includes an offset error in an initial state. When the displacement detection sensor is used, servo control is performed with reference to a target position where the displacement of the tracking actuator is not zero in practice, resulting in poor tracking performance.

Furthermore, sensors for detecting a very small displacement such as a displacement of the tracking actuator must have very high precision. In such high-precision sensors, an offset is further increased due to their high temperature dependency, thus further impairing tracking performance.

SUMMARY OF THE INVENTION

It is an object of the present invention to provide an information recording/reproducing apparatus which does not require complicated adjustment, and has highly stable tracking performance to a target position with respect to a change in temperature.

According to the present invention, there is provided an optical recording/reproducing apparatus comprising a first compensating circuit for extracting a portion of a drive signal for a fine actuator for causing a light spot to track a target position on a recording medium, and a second compensating circuit for extracting a portion of a detection output of an operation amount of the fine actuator circuit, wherein a signal as a sum of the outputs from the first and second compensating circuits is used as a drive signal for a coarse actuator for moving the light spot over a recording region of the recording medium.

With the apparatus of the above arrangement, the drive signal of the coarse actuator includes a highly reliable portion of a signal which is obtained in accordance with a current state of the information recording/reproducing apparatus.

BRIEF DESCRIPTION OF THE DRAWINGS

FIG. 1 is a block diagram of an information recording/reproducing apparatus according to an embodiment of the present invention;

FIG. 2 is a graph showing a characteristic of a conventional tracking actuator;

FIGS. 4A to 4C are graphs showing characteristics of a low-pass filter and a high-pass filter used in the information recording/reproducing apparatus shown in FIG. 3;

FIG. 6 is a block diagram of an information recording/reproducing apparatus according to another embodiment of the present invention;

FIG. 7 is a detailed block diagram of the information recording/reproducing apparatus in the embodiment shown in FIG. 6;

FIGS. 11A and 11B are graphs showing an actuator moving distance obtained when the embodiment shown in FIG. 10 is operated by a computer simulation;

FIGS. 12A and 12B are graphs showing a velocity deviation obtained when the embodiment shown in FIG. 10 is operated by a computer simulation;

FIG. 13 is a partial block diagram of the information recording/reproducing apparatus as a partial modification of the embodiment shown in FIG. 9;

FIG. 14 is a block diagram showing a track access control system of the information recording/reproducing apparatus according to still another embodiment of the present invention;

FIG. 16 is a block diagram showing an information recording/reproducing apparatus according to still another embodiment of the present invention; and FIG. 17 is a timing chart for explaining the operation of the apparatus shown in FIG. 16.

DETAILED DESCRIPTION OF THE PREFERRED EMBODIMENTS

Figure 3:
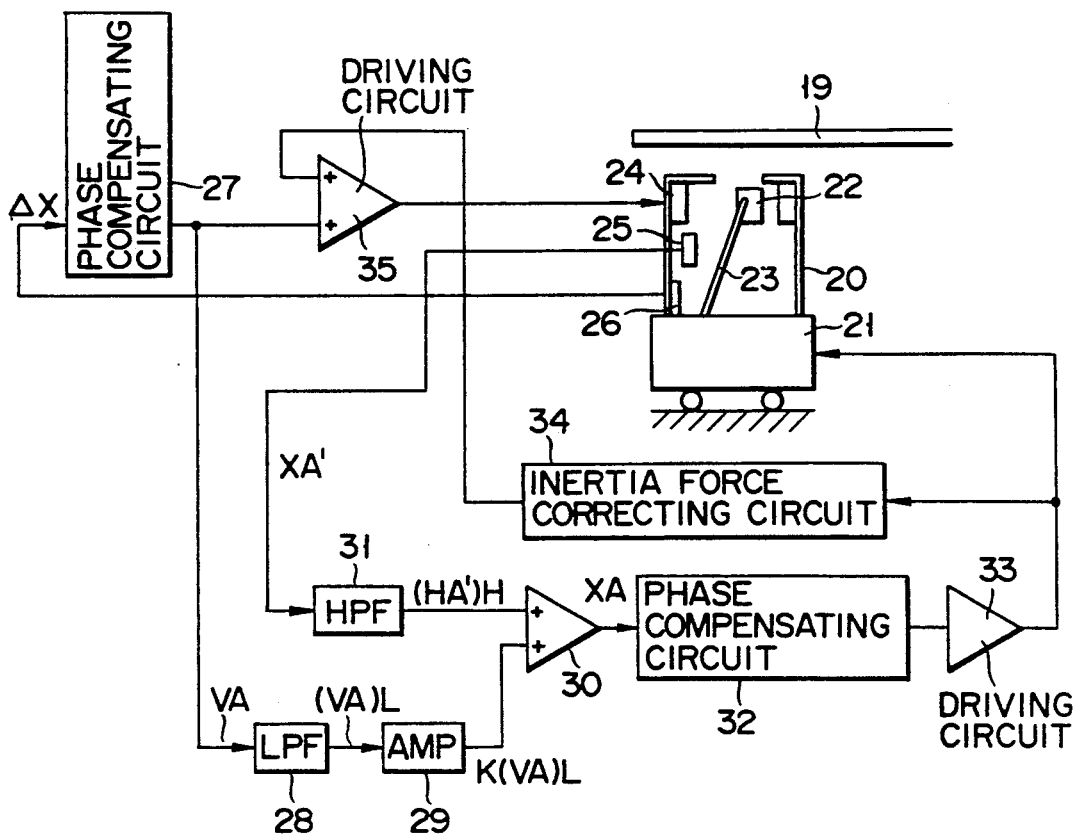
FIG. 3 is a detailed block diagram of the information recording/reproducing apparatus in the embodiment of FIG. 1.

FIG. 1 shows the principle of an embodiment of the present invention. Referring to FIG. 1, a drive signal VA is input to a fine actuator 13. A displacement signal XA' of fine actuator 13 is detected by a displacement detection sensor 14. The displacement signal XA' is input to a high-pass filter 15, and its high-frequency component (XA')H is extracted from the displacement signal XA'. The drive signal VA is input to a low-pass filter 16, and its low-frequency component (VA)L is extracted from the drive signal VA. The extracted low-frequency component (VA)L is amplified by an amplifier 17 having a proper gain K so that its sensitivity is matched with that of the high-frequency component (XA')H. The amplified low-frequency component is then added to the high-frequency component (XA')H by an adder 18. An output XA from the adder 18 is given by (XA')H+K.(VA)L, and serves as a drive signal for a course actuator (not shown in FIG. 1).

The displacement signal XA' detected by the displacement detection sensor 14 includes an offset signal component based on the sensor 14 as a DC error. The high-frequency component is extracted from the displacement signal X'A by the high-pass filter 15. Since the resultant high-frequency signal (X'A)H does not include a DC component, the high-frequency component does not include the influence of an offset caused by the displacement detection sensor 14. A displacement of the fine actuator 13 caused by the drive signal VA is determined by the characteristic of the fine actuator 13 itself. FIG. 2 shows the characteristic of a conventional tracking actuator. The amplitude gain of fine actuator 13 is almost constant in a low-frequency region, but is increased near a given frequency, and is then decreased in a high-frequency region as the frequency is increased. The given frequency yielding the maximum amplitude gain is called a resonance frequency fA of the fine actuator 13. As can be seen from FIG. 2, since the amplitude gain is almost constant in a frequency region sufficiently lower than the resonance frequency fA, the displacement of the fine actuator 13 is determined by its sensitivity. More specifically, the low-frequency component (VA)L is amplified by the amplifier 17 of the gain K which is determined in correspondence with the sensitivity of the fine actuator 13 in the low-frequency region, and the amplified signal K.(VA)L represents the displacement of fine actuator 13 in the low-frequency region. Therefore, if the low-frequency component K.(VA)L is added to the high-frequency component (X'A)H, the characteristic of the fine actuator 13 can be used without modification under a condition that the information recording/reproducing apparatus is actually used in a high-frequency region including a frequency region near the resonance frequency wherein the characteristic of the actuator is easily changed depending on a temperature. Since the characteristic is relatively stable in the low-frequency region which has a problem in detection of an actual displacement, a predicted value of the displacement of fine actuator 13 can be used. Therefore, a high-precision drive signal for the linear motor can be obtained.

FIG. 3 shows a detailed arrangement of this embodiment. Referring to FIG. 3, a linear motor 21 moves a carriage 20 in the radial direction of an optical disk 19. An objective lens 22 is supported on the carriage 20 through an elastic support member 23. The carriage 20 is provided with a tracking actuator 24 for moving the objective lens 22, a displacement detection sensor 25 for detecting a displacement of the objective lens 22 moved by the tracking actuator 24, and a tracking error sensor 26 for detecting a positional error of a light spot radiated from the objective lens 22 with respect to a target track of the optical disk 19.

A positional error signal Δx obtained by the tracking error sensor 26 and representing a positional error between the spot and the track is input to a phase compensating circuit 27 for the tracking actuator, thus forming a tracking actuator drive signal VA. A high-frequency component is removed from the drive signal VA by a low-pass filter 28 to obtain a low-frequency component (VA)L. The low-frequency component (VA)L is amplified by an amplifier 29 having a gain K to obtain a signal K.(VA)L. The signal K.(VA)L is input to one terminal of an adder 30.

A low-frequency component is removed from a displacement signal XA' of the objective lens 22 detected by the displacement detection sensor 25 by a high-pass filter 31 to obtain a high-frequency component (XA')H. The high-frequency component (XA')H is input to the other terminal of the adder 30. The high-frequency component (XA')H is added to the amplified low-frequency component K.(VA)L, and the sum is amplified, thus obtaining a signal XA. The signal XA is input to a linear motor driving circuit 33 through a phase compensating circuit 32 for the linear motor. The linear motor is driven by the output from the driving circuit 33.

The output from the driving circuit 33 is input to one terminal of a tracking actuator driving circuit 35 comprising an adder through an inertia force correcting circuit 34. The inertia force correcting circuit 34 cancels an inertia force to prevent the tracking actuator 24 from being moved by the inertia force generated when the linear motor 21 is moved. The other terminal of the driving circuit 35 receives the tracking actuator drive signal VA as an output from the phase compensating circuit 27. The signals input to the driving circuit 35 are added and amplified. The resultant signal drives the tracking actuator 24.

With the above arrangement, the high-frequency component (XA')H from which an offset of the displacement detection sensor 25 is removed and the low-frequency component (VA)L obtained by the tracking error sensor 26 are added to each other, thus forming the linear motor drive signal which can provide the characteristic of the tracking actuator with high precision. FIGS. 4A to 4C show characteristics of the low-pass filter 28 and the high-pass filter 31 in comparison with the characteristic of the tracking actuator 24. FIG. 4A shows the characteristic of the tracking actuator, FIG. 4B shows the characteristic of the high-pass filter, and FIG. 4C shows the characteristic of the low-pass filter. In FIG. 4A, the characteristic of the tracking actuator is expressed by:

$$\text{Resonance frequency } fA = \frac{1}{2\pi}\sqrt{kA/mA}$$

where mA is the mass of a movable portion of the tracking actuator, i.e., the objective lens in this embodiment, and kA is the spring constant of the elastic member supporting the objective lens. At a frequency higher than the resonance frequency, the characteristic is expressed by −12 dB/oct, and the amplitude gain is decreased. In FIG. 4B, the characteristic of the high-pass filter changes at +6 dB/oct in a frequency region lower than the cutoff frequency fH. If an error between the target track and the light spot obtained by the low-pass filter can be satisfactorily detected, the characteristic is not limited to +6 dB/oct. The cutoff frequency fH has a relation of fH < < fA, and is determined so as not to be influenced by a frequency range near the resonance frequency fA of the characteristic of the tracking actuator. In FIG. 4C, the characteristic of the low-pass filter changes at −12 dB/oct in a frequency region higher than a cutoff frequency fL. The cutoff frequency fL has a relation of fL < < fA as in fH, and is determined so as not to be influenced by the characteristic of the tracking actuator. The characteristic of the low-pass filter in a frequency region higher than the cutoff frequency fL is set to exhibit a decrease by an absolute value of 12 dB/oct or more. In this region, a signal based on the output from the displacement detection sensor must be obtained. However, if the low-pass filter has a decreasing characteristic by an absolute value of 12 dB/oct or less, the amplitude gain of the low-pass filter may become higher than that of the tracking actuator at a given frequency. In this case, the output from the low-pass filter is dominant, and a signal based on the displacement of the objective lens can no longer be obtained.

Figure 5:
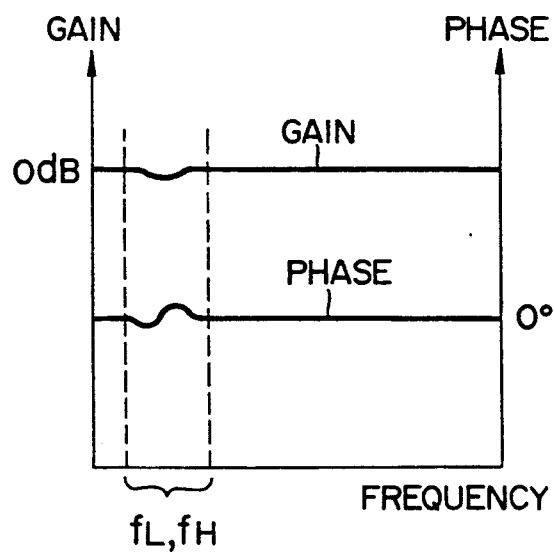
FIG. 5 is a graph showing the relationship between an actual displacement of a tracking actuator and a linear motor drive signal.

FIG. 5 shows a frequency characteristic of a transfer function between an actual displacement of the tracking actuator and the signal XA shown in FIG. 3 in the above arrangement. As can be seen from FIG. 5, the gain of the signal XA obtained for the actual displacement of the tracking actuator is almost 0 dB, and it can be said that the gain and the displacement are the same. Since the phase is neither delayed nor advanced and is almost 0°, this reveals that tracking performance is good. However, the gain and the phase are slightly disturbed near fH and fL. In this frequency region, since the gain of a servo system of the linear motor is sufficiently high, this disturbance does not influence stability at all.

In this embodiment, a coarse actuator is exemplified as a linear motor, and a fine actuator is exemplified as an objective lens moving system. However, a swing-arm system may be employed as a coarse actuator, and a galvano-mirror system may be employed as a fine actuator.

According to the above embodiment, since cumbersome adjustment is not necessary, assembly is easy, and highly stable tracking performance to a target position with respect to a change in temperature can be assured.

The principle of another embodiment of the present invention will be described below with reference to FIG. 6.

In FIG. 6, a difference signal between a target velocity value signal V0 and a pseudo relative velocity signal Vc is processed by a gain compensating circuit 125, and the processed signal is supplied to a fine actuator 126. A displacement of a light spot by the fine actuator 126 is detected by a displacement detector 127. The detection signal from the detector 127 is processed by a phase compensating circuit 128, and the processed signal is output to a coarse actuator 129 as a drive signal. The displacements of the fine and coarse actuators 126 and 129 are added to each other to obtain a position of the light spot. The position signal is differentiated by a differentiation circuit 130 to be converted to a velocity signal. A velocity V of the recording medium in a tracking direction is subtracted from a velocity represented by the velocity signal, thus obtaining a relative velocity Vc between the light spot and an information track. The relative velocity Vc is detected by a relative-velocity detecting circuit 131, and a detection signal is input to a low-pass filter 132.

The output from the displacement detector 127 is supplied to a displacement-velocity converting circuit 133 to be converted to a velocity signal. The velocity signal is input to a high-pass filter 134. The signals output from the low-pass filter 132 and the high-pass filter 134 are added to each other to form a pseudo relative velocity signal Vc. The pseudo relative velocity signal is subtracted from the target velocity value signal V0.

As described above, in a high-frequency range where the coarse actuator 129 cannot track, the fine actuator 126 responds, and a displacement velocity at that time is detected as a high-frequency component of the velocity signal. In a low-frequency region, the second actuator 129 responds, and can access the entire recording medium. In this case, a signal detected by the relative-velocity detecting circuit 131 serves as a low-frequency component of the velocity signal.

FIG. 7 shows a first embodiment embodying the present invention described with reference to FIG. 6. According to this embodiment, an access device moves a light spot 103 in the radial direction of an optical disk 102, which is rotated by a spindle motor 101, to access a desired information track of the optical disk 102. An optical head 104 for forming the light spot 103 is driven by a linear motor 105 over a wide range in the radial direction of the optical disk 102. The light spot is finely moved at high speed by a tracking actuator 106 mounted on the optical head 104 in a small range in the radial direction of the disk. In this embodiment, a reflected light signal of the light spot 103 from the optical disk 102 is supplied to a tracking-error detecting circuit 107 to obtain a tracking error signal representing a positional error of the light spot 103 with respect to the information track. Based on the tracking error signal, a relative-velocity detecting circuit 180 detects a relative velocity between the light spot 103 and the information track, and the detection signal is input to a low-pass filter 140, so that a low-frequency component is extracted from the detection signal. The low-frequency component is supplied to one input terminal of an adder 141.

The optical head 104 comprises a displacement detector 142 for detecting a displacement of the light spot by the tracking actuator 106 The output from the displacement detector 142 is supplied to one input terminal of a differential amplifier 143 and to a displacement-velocity converting circuit 144. The other input terminal of the differential amplifier 143 receives a target value of the displacement of the light spot 103 by the tracking actuator 106, which is output from a target displacement value generator 145. The output from the differential amplifier 143 is supplied to the linear motor 105 as a drive signal through a phase compensating circuit 146 for stabilizing a servo loop.

The displacement-velocity converting circuit 144 converts the displacement of the light spot 103 by the tracking actuator 106 into a velocity signal. The velocity signal is supplied to a high-pass filter 147, so that its high-frequency component is extracted. The high-frequency component is supplied to the other input terminal of the adder 141. The adder 141 then adds the low-frequency component of the relative velocity and the high-frequency component of the displacement velocity of the light spot 103 by the fine actuator 106, thus obtaining the pseudo relative velocity Vc. The pseudo relative velocity signal is input to one input terminal of a differential amplifier 109.

The other input terminal of the differential amplifier 109 receives the target value V0 of the relative velocity between the light spot 103 and the information track, which is output from a target-velocity value generator 110, thus detecting a difference between the target velocity value V0 and the pseudo relative velocity signal Vc. The output signal from the differential amplifier 109 is supplied to the tracking actuator 106 as a drive signal through a gain compensating circuit 111 for improving a characteristic of the servo loop, thus forming a velocity control loop.

The operation of this embodiment will be described below.

When the difference signal between the target velocity value V0 and the pseudo relative velocity signal Vc is supplied to the tracking actuator 106 through the gain compensating circuit 111, the tracking actuator 106 drives a lens, mirror, or other means to move the light spot 103 so as to cause the relative velocity between the light spot 103 and the information track to coincide with the target velocity value V0. A displacement of the light spot 103 due to the tracking actuator 106 is detected by the displacement detector 142 on the basis of a reference position fixed on the optical head 104. When the difference signal between the displacement and the target displacement value from the target displacement value generator 145 is input to the linear motor 105, a position servo system is formed for the displacement of the light spot 103 due to the linear motor 105. If the target displacement value is set to be equal to the output of the displacement detector 142 at the reference position of the optical head 104, the coarse actuator 105 is controlled so that the light spot 103 is always located at the reference position of the optical head 104.

Since the band of the position servo system is in a relatively low-frequency range due to the nature of the linear motor 105, the high-frequency component of the velocity of the light spot 103 is almost equal to the relative velocity between the optical head 104 and the light spot 103. Since the frequency characteristic of a disturbance velocity caused by the influence of eccentricity of a disk or the like is decreased as the frequency is increased, the relative velocity between the optical head 104 and the light spot 103 almost coincides with the relative velocity between the light spot 103 and the information track in a high-frequency region. In contrast to this, in a low-frequency region, since the influence of the disturbance velocity is large, the relative velocity must be detected from the tracking error signal. In this embodiment, the displacement detected by the displacement detector 142 is converted to the velocity signal by the displacement-velocity converting circuit 144, as described above, and the high-frequency component is extracted from the velocity signal by the high-pass filter 147. The low-frequency component is extracted by the low-pass filter 140 from the velocity signal generated based on the tracking error signal by the relative-velocity detecting circuit 108. The high- and low-frequency components are added to each other to obtain the pseudo relative velocity signal Vc. The difference signal between the pseudo relative velocity signal Vc and the target velocity value signal V0 is supplied as a drive signal to the tracking actuator 106 through the gain compensating circuit 111.

With the above arrangement, precision of the velocity control system associated with the relative velocity between the light spot and the information track upon accessing can be improved, and hence, the relative velocity when the light spot runs into the target track can be decreased to be smaller than a critical velocity. Therefore, the light spot can be stably tracked on the target track. Since the linear motor 105 is operated in cooperation with the tracking actuator 106, the light spot can reach the target track without switching a control mode during an operation. Therefore, the control system can be simplified. In the above arrangement, the displacement detector 142 can be constituted by arranging a sensor for detecting a displacement or an angle to a movable portion of the tracking actuator 106, and the displacement-velocity converting circuit 144 may comprise a differentiation circuit.

Figure 8:
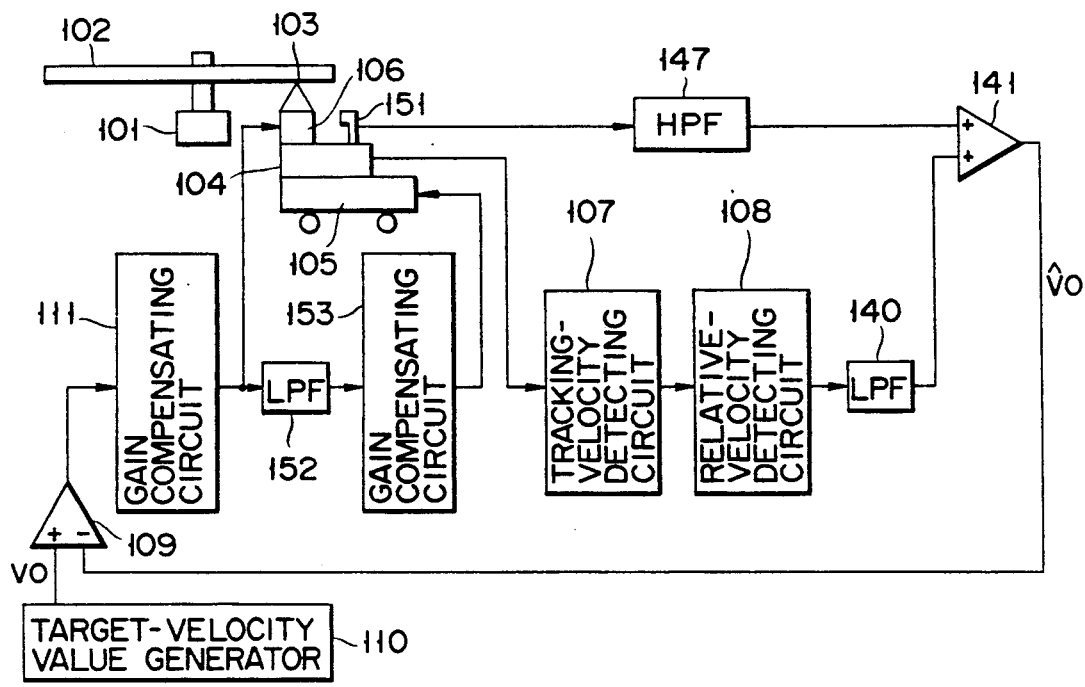
FIG. 8 is a block diagram of an information recording/reproducing apparatus according to still another embodiment of the present invention.

FIG. 8 shows a second embodiment of the present invention. In this embodiment, the velocity of a tracking actuator 106 is directly detected by a velocity detector 151, and is supplied to an adder 141 through a high-pass filter 147. A low-frequency component of a drive signal of the tracking actuator 106 is extracted by a low-pass filter 152, and is supplied to a linear motor 105 as a drive signal through a phase compensating circuit 153. According to this embodiment, the same effect as in the first embodiment can be obtained, and the velocity detector 151 can be arranged to detect a counter-electromotive force of an actuator driving coil. Therefore, a circuit for converting a displacement into a velocity can be omitted, and hence, the arrangement can be further simplified.

The present invention is not limited to an optical disk but may be effectively applied to an access device for an optical head used for an opto-magnetic disk or an optical card.

According to the above embodiments, a linear motor for moving an optical head over a wide range is controlled on the basis of an output from a displacement detector for detecting a displacement of a light spot by a first actuator which moves a light spot at least within a small range, and the tracking actuator is controlled on the basis of a high-frequency component of the output from the displacement detector and a low-frequency component of an output from a relative velocity detecting circuit for detecting a relative velocity between the light spot and an information track. Therefore, precision of a velocity control system associated with the relative velocity between the light spot and the information track upon accessing can be improved. Therefore, the relative velocity when the light spot runs into a target track can be decreased to be smaller than a critical velocity, and the light spot can be stably tracked on the target track. Since the linear motor is operated in cooperation with the tracking actuator, the light spot can reach the target track without switching a control mode during an operation. As a result, a control system can be simplified.

Another embodiment will be described below with reference to FIG. 9.

An optical disk 202 of this embodiment is rotated by a spindle motor 203. An optical head 204 is arranged to oppose the optical disk 202. The optical head 204 is movable in a direction crossing a track, i.e., the radial direction of the optical disk 202 by a linear motor 205 such as a voice coil motor or the like. The optical head 204 is provided with a light beam generator such as a laser diode. A light beam is focused on a track of the optical disk 202 by an objective lens 207 which is movable within a small range by a tracking actuator 206.

A position detecting circuit 209 comprises a photodetector for detecting a moving position of the optical head 204. The photodetector extracts a differential component to detect a positional error between a light spot and the track, and supplies a tracking error signal to a tracking control circuit 211.

In a track access device 241, an output from a velocity indicating circuit 213 is output to an error detecting circuit 217, and is also input to a filter 242. The velocity indicating circuit 213 has a track counter 214 for receiving the tracking error signal. The counter 214 is preset to be a value corresponding to the number of tracks to be crossed, which is set by an external device 215, and counts down in response to the tracking error signal. The output from the track counter 214 is input to a velocity output circuit 216. The circuit 216 outputs a signal for indicating a moving velocity in accordance with the number of remaining tracks to the target track.

The output from the filter 242 is added to an output signal from a fine actuator position detector 243 for detecting the position of the objective lens 207 (or tracking actuator 206) by an adder 244. The sum output drives a linear motor 205 through a switch 212' which is cooperated with a control loop switch 212. Thus, a velocity control system by feed-forward compensation is constituted.

When the switches 212 and 212' are switched to contact a side, the output from the tracking control circuit 211 is output to the linear motor 205 and tracking actuator 206, thus constituting a normal two-stage tracking control system.

Figure 10:
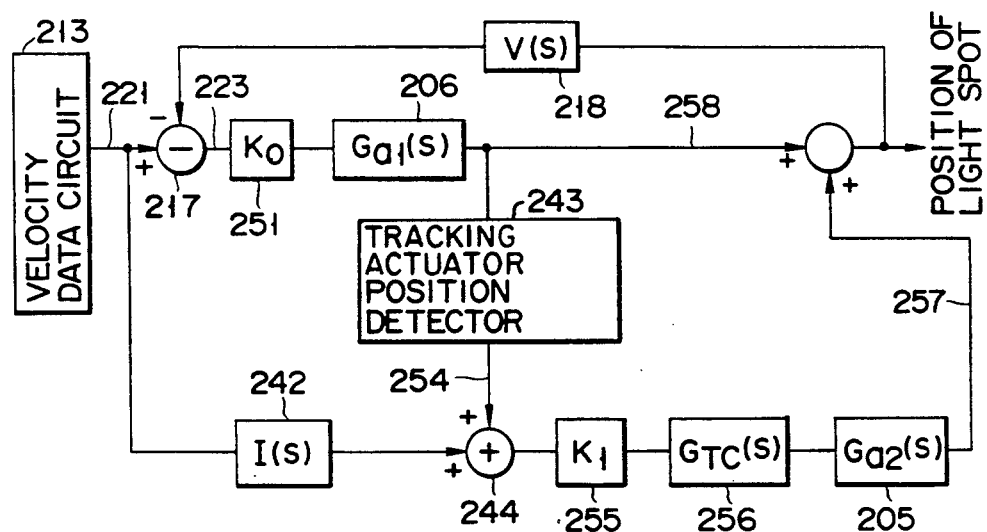
FIG. 10 is a detailed block diagram of the information recording/reproducing apparatus in the embodiment shown in FIG. 9.
Figure 9:
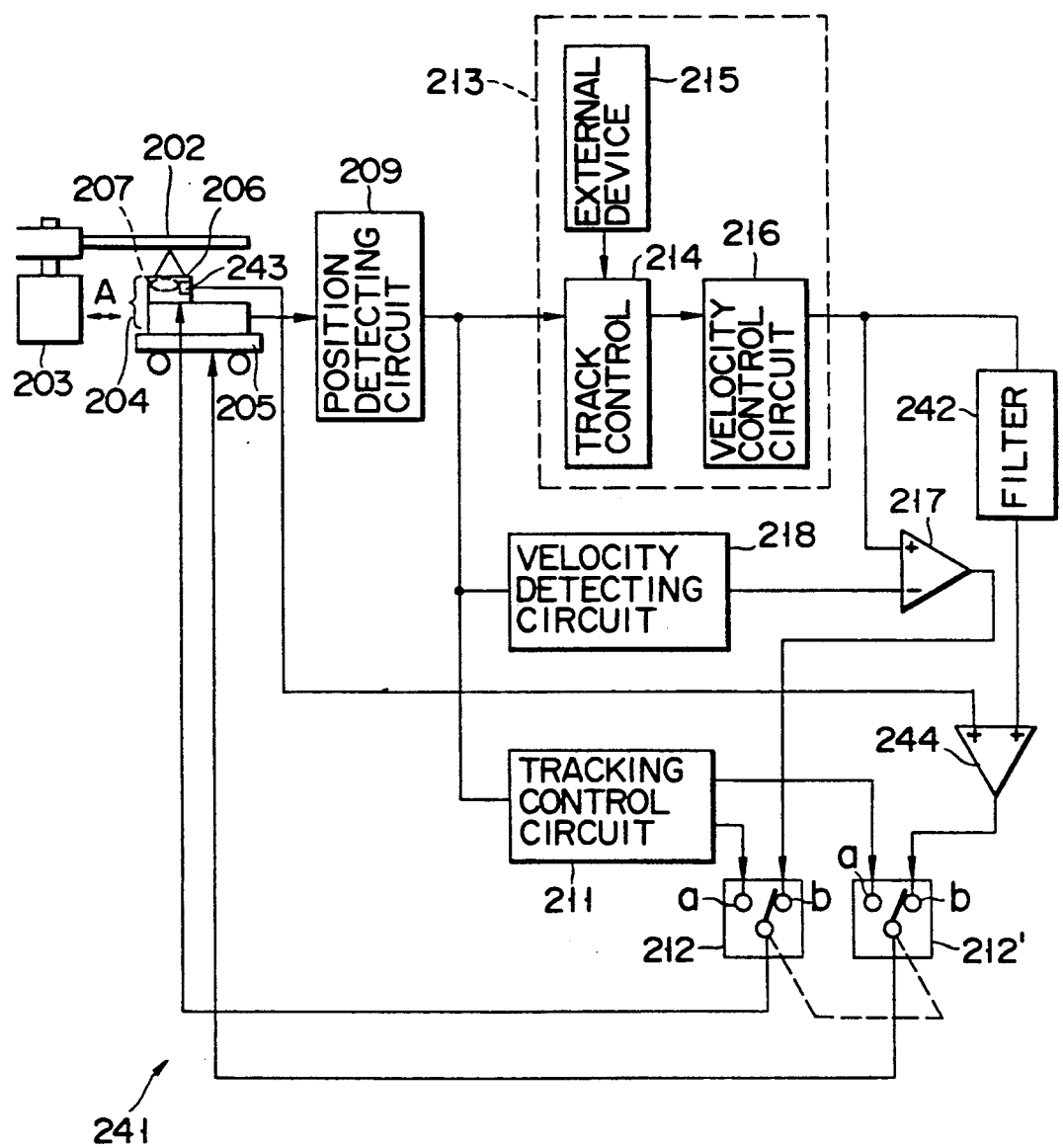
FIG. 9 is a block diagram of an information recording/reproducing apparatus according to still another embodiment of the present invention.

FIG. 10 shows an embodiment wherein a two-stage velocity control system is constituted in the arrangement of FIG. 9.

The velocity indicating circuit 213 outputs a velocity indication value 221 which becomes optimal when the target track is accessed using the tracking error signal for detecting a light spot position. The velocity indication value 221 is input to the error detecting circuit 217 to calculate a velocity deviation value 223 as a difference from a velocity detected by the velocity detecting circuit 218. The velocity deviation value 223 is amplified by an amplifier 251 of a gain K0, and drives the tracking actuator 206. The fine actuator 206 has quick response, and its transfer function is expressed by Ga1(s). Movement of the tracking actuator 206 is detected by the tracking actuator position detector 243, and is output as a tracking actuator position signal 254.

The velocity indication value 221 is added by the adder 244 to the position signal 254 through the filter 242 of a transfer function I(s). The sum signal is amplified by an amplifier 255 of a gain K1. The amplified signal passes through a phase compensating circuit 256 comprising a phase advancing circuit of a transfer function Ge(s), thus driving the linear motor 205 of a transfer function Ga2(s). Thus, a feed-forward compensation control system is formed.

The output from the linear motor 205 represents a linear motor position 257. The position 257 is added to a tracking actuator position 258 output from the tracking actuator 206. The position defined by the sum is a light spot position, and is detected as a velocity by the velocity detecting circuit 218 of a transfer function V(s). The velocity is fed back to the error detecting circuit 217.

The operation of the feed-forward compensation control system will be described below using a computer simulation result.

The transfer functions Ga1(s) and Ga2(s) of the tracking actuator 206 and linear motor 205 are expressed by, e.g., the following equations:

$$Ga1 = \omega n2/(s2 + 2 \cdot \xi \cdot \omega n2 + \omega n2)$$

$$Ga2 = 1/s2$$

In the above equations, constants $\xi$ and $\omega n$ are approximated to $\xi = 0.089$ and $\omega n = 333$ rad/s by experimental data.

The gains K0 and K1 of the amplifiers 251 and 255 and the transfer function Gc(s) of the phase compensating circuit 256 are set to be values expressed by the following equations in accordance with tracking performance with respect to disturbance, e.g., eccentricity of an optical disk.

$$K0 = 0.3, K1 = 1.4 \times 10^6$$

$$Gc(s) = (\alpha \cdot Td \cdot s + 1)/(Td \cdot s + 1)$$

(where $\alpha = 7.56$ and $Td = 1.93 \times 10^{-4}$)

The transfer function V(s) of the velocity detecting circuit 218 is set as follows as an ideal velocity detector:

$$V(s) = s$$

The transfer function I(s) of the filter 242 is set as follows:

$$I(s) = TH \cdot s \, K2/(TH \cdot s + 1)$$

The transfer characteristic I(s) has a high-pass filter characteristic of, e.g., 140 Hz, and its gain K2 is set to be a value so that a regular position deviation of a light spot by the tracking actuator 206 and a regular velocity deviation of the entire two-stage velocity control system become zero. In this case, TH and K2 are given by:

$$TH = 1.14 \times 10^{-3}$$

$$K2 = 6.29 \times 10^{-4}$$

FIGS. 11A and 11B show computer simulation results of movement of the tracking actuator 206 when an acceleration input of 10G is input from the velocity indicating circuit 213 as the velocity indication value 221. FIG. 11A shows a state when no feed-forward compensation is performed (i.e., when the filter 242 is omitted from FIG. 10). In FIG. 11A, the moving distance of the tracking actuator is about 70μ. Contrary to this, in a state wherein feed-forward compensation is performed, as shown in FIG. 11B, a moving distance is a maximum of −5μ, and is greatly decreased. In addition, for the regular position deviation, when the feed-forward compensation is performed, the moving distance becomes 0; otherwise, the moving distance is about 70μ.

FIGS. 12A and 12B show computer simulation results of the velocity deviation when an acceleration input of 10G is input from the velocity indicating circuit 213 as the velocity indication value 221.

When no feed-forward compensation is performed, a deviation of a maximum of about 2.9 mm/s occurs, as shown in FIG. 12A. When feed-forward compensation of this embodiment is performed, the deviation is improved to a maximum of about 1.9 mm/s, as shown in FIG. 12B. A regular velocity deviation is 0.23 mm/s when no feed-forward compensation is performed, while it is 0 when feed-forward compensation is performed.

When a light spot is immediately accelerated at the beginning of track access, the response time of the linear motor 205 can be greatly shortened by the feed-forward compensation, as shown in FIG. 12B. In addition, as shown in FIG. 11B, the tracking actuator 206 can be prevented from being transiently moved by a large distance. That is, a transient response characteristic can be greatly improved, and a regular velocity deviation after a transient state can also be greatly improved. In this manner, according to the present invention, regular and transient characteristics can be improved.

As described above, according to the embodiment shown in FIGS. 9 and 10, a feed-forward compensated velocity control system is constituted as follows. The tracking actuator 206 is driven in accordance with the velocity deviation 223 detected by the error detecting circuit 217. The position signal 254 of the tracking actuator 206 and the velocity indication value 221 which passes through the (high-pass) filter 242 for removing at least a DC component are added by the adder 244, and the linear motor 205 is driven in accordance with the sum signal. Therefore, in the two-stage velocity control system using the tracking actuator 206 and linear motor 205, in accessing, the transient moving distance of the tracking actuator 206 can be greatly controlled, and degradation in performance of an optical system caused by overshooting of a light spot can be minimized. In addition, a velocity deviation can be eliminated, and hence, the light spot can be very stably tracked on the target track upon switching from the velocity control system to the tracking control system with respect to the target track.

That is, since the light spot can be stably tracked on the target track, a time required for reading an address of a wrong track and a time required for a reaccess operation can be omitted. As a result, an access time can be greatly shortened.

In the above embodiment, the position detecting circuit 243 can comprise a position sensor for detecting the position of the objective lens 207 constituting the tracking actuator 206. As shown in FIG. 13 as a part of a modification, a drive current supplied to the tracking actuator 206 through a driver 259 (a current with which the position of the tracking actuator 206 can be estimated) may be input to the adder 244 without using the position sensor.

Note that FIG. 13 shows an arrangement wherein the linear motor 205 is driven through the phase compensating circuit 256 and a driver 260. A phase compensating circuit or the like may be inserted in the circuit of the tracking actuator 206 side.

Still another embodiment will be described below with reference to FIG. 14 wherein access is performed using only a linear motor 205.

A difference between a velocity indication value 221 output from a velocity indicating circuit 213 and an output from a velocity detecting circuit 218, having a transfer function V(s), for detecting a velocity of a light spot corresponds to a velocity deviation 223. The velocity indication value 221 is input to a filter 242 having a transfer function I(s), and the filter output is added to the velocity deviation 223. The sum signal is amplified with a gain K by an amplifier 261, thereby driving the linear motor 205 having a transfer function Ga2(s).

The transfer function I(s) of the filter 242 and the gain K are different from those in the embodiment shown in FIGS. 9 and 10.

Figure 15A:
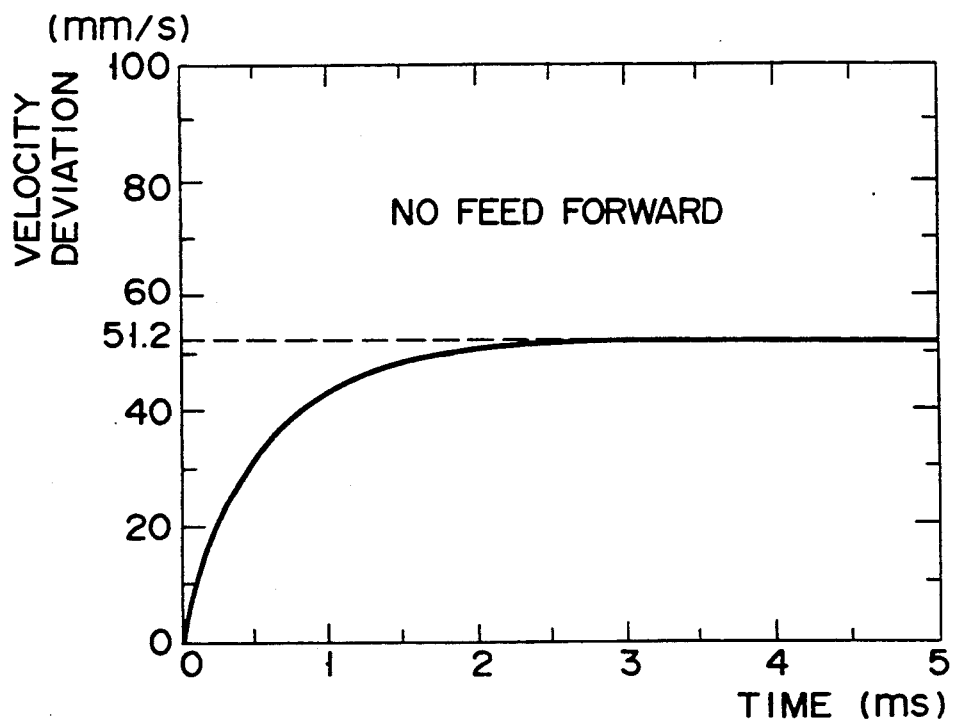
FIGS. 15A and 15B are graphs showing a velocity deviation obtained when the embodiment shown in FIG. 14 is operated by a computer simulation.
Figure 15B:
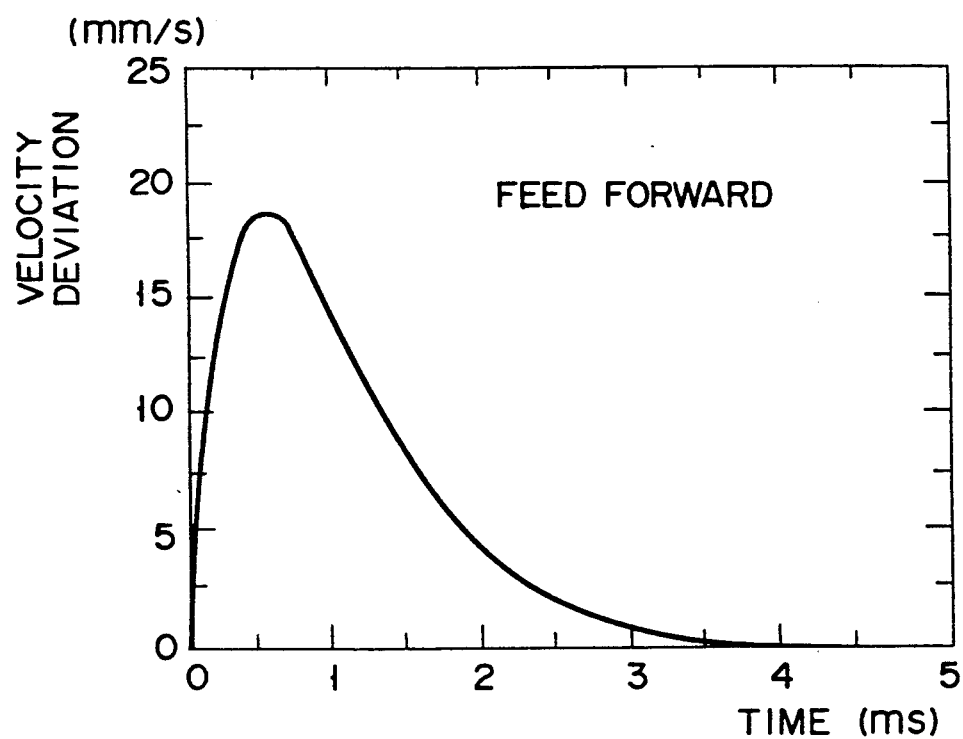

FIGS. 15A and 15B show computer simulation results of a velocity deviation when an acceleration input of 10G is input as the velocity indication value 221 in the embodiment shown in FIG. 14.

As shown in FIG. 15A, when no feed-forward compensation is performed (the filter 242 is omitted from FIG. 14), a regular velocity deviation is 51.2 mm/s, while when feed-forward compensation is performed, the regular velocity deviation can be suppressed to 0 mm/s, as shown in FIG. 15B.

Note that the velocity detecting circuit 218 is not particularly limited to those for detecting a velocity on the basis of a tracking error signal, an external scale, and the like. The embodiment shown in FIG. 14 can be realized by a circuit wherein a portion between the error detecting circuit 217 and the contact b of the switch 212 is turned off in FIG. 9.

FIG. 16 shows still another embodiment of the present invention.

In this embodiment, the filter characteristic of the filter 242 for performing feed-forward compensation is controlled by the velocity indicating circuit 213. In this embodiment, the filter is designated by reference numeral 271.

The filter 271 comprises, e.g., a voltage-controlled amplifier (to be abbreviated to as a VCA hereinafter) 271. The VCA 271 is assumed to exhibit a characteristic in which a gain is increased as an application voltage is lowered. That is, when a light spot is immediately accelerated at time t0 at the beginning of track access, the gain of the VCA 271 is increased, and after the velocity reaches a regular velocity, the gain is decreased.

At time t0 at the beginning of track access, a track access start signal is input from an external device 215 to a filter control circuit 272, and the filter 271 is controlled on the basis of the track access start signal. After the velocity reaches the regular velocity, the gain is decreased, so that the apparatus does not respond to an external vibration with a short response time. Thereafter, the output from a track counter 214 is decreased, and the gain is increased at the end of track access, thus immediately decelerating the light spot. Upon this deceleration, an actual track crossing velocity of the light spot is decreased below a velocity at which the light spot can be stably guided to a track. When the apparatus is switched to tracking control, the light spot is reliably guided to the target track.

In this embodiment, the filter characteristic is changed by changing the gain of the VCA 271. Alternatively, the filter characteristic may be controlled by changing a passband or the like of the filter.

Similar control may be made by arranging the VCA at an input or output side of the filter 242.

In some cases, the filter 242 may be simply turned on/off. The filter 242 can comprise a filter which can essentially cut a DC component and can supply a drive signal for quickly driving the coarse actuator 205. Therefore, a filter which allows a little DC component to pass therethrough may be used.

Different embodiments may be provided by partially combining the above embodiments. The present invention can be applied to an apparatus which is operated in only a portion of an access operation period, e.g., at the beginning or end of the access operation.

The present invention is not limited to an optical recording/reproducing apparatus which is rotated by a spindle motor but may be applied to a card-like optical recording/reproducing apparatus (optical card apparatus).

As described above, according to the present invention, a velocity control system is constituted as follows. That is, a velocity indication value is filtered by a filter for cutting at least a DC component upon access, and a difference between the filtered velocity indication value and an output from a velocity detecting means is then calculated. Thereafter, a coarse actuator is driven by a signal corresponding to a sum of the filtered signal and a position signal. Therefore, a velocity deviation can be minimized, and a target track can be stably accessed.

What is claimed is:

1. An information recording/reproducing apparatus comprising:
   optical means for projecting a light spot on a recording medium having a track;
   first driving means for causing the light spot to finely track the track within a limited range of said recording medium;
   second driving means capable of moving the light spot over said recording medium for more than said limited range, said second driving means having a positioning accuracy lower than that of said first driving means;
   detecting means for detecting a moving distance of said first driving means and outputting a detection signal;
   first drive signal outputting means for outputting a drive signal for driving said first driving means;
   first compensating means for extracting a first frequency signal of a first frequency range from the drive signal output from said first drive signal outputting means, and for outputting said first frequency signal as a first compensation signal;
   second compensating means for extracting a second frequency signal of a second frequency range from the detection signal output from said detecting means, and for outputting said second frequency signal as a second compensation signal; and
   second drive signal outputting means for adding said first compensation signal and said second compensation signal to form a drive signal for driving said second driving means.

2. An apparatus according to claim 1, wherein said first driving means comprises tracking actuator means for driving said optical means to cause the light spot to track the track, and said detecting means comprises sensor means for detecting a displacement of said optical means.

3. An apparatus according to claim 1, wherein said first drive signal outputting means comprises positional error detecting means for detecting a positional error between the light spot and the track and outputting means for outputting a drive signal according to the positional error detected by said positional error detecting means.

4. An apparatus according to claim 1, wherein said second compensating means comprises high-pass filter means for removing a low-frequency component from the detection signal output from said detecting means and outputting a high-frequency component signal as the second compensation signal, said first compensating means comprises low-pass filter means for removing a high-frequency component from the drive signal and outputting a low-frequency component signal, and amplifier means for amplifying the low-frequency component signal with a predetermined gain to match it with the high-frequency component signal, and outputting the amplified signal as the first compensation signal.

5. An apparatus according to claim 1, wherein said second drive signal outputting means comprises adder means for adding the first and second compensation signals output from said first and second compensating means and outputting a sum signal, a phase compensating circuit for phase-compensating the sum signal output from said adder means and outputting a phase-compensated signal, and a driving circuit for converting the phase-compensated signal into the drive signal.

6. An apparatus according to claim 1, wherein said first drive signal outputting means comprises positional error detecting means for detecting a positional error between the light spot and the track and outputting a detection signal, inertia force correcting means for removing an inertia force component of said second driving means from the second drive signal output from said second drive signal outputting means and outputting a corrected signal, and adder means for adding the detection signal and the corrected signal to form the first drive signal.

7. An information recording/reproducing apparatus comprising:
   optical head means for projecting a light spot onto a recording medium having a track, and for outputting a reproduction signal corresponding to a reflection signal;
   first driving means for causing the light spot to finely track and track within a limited range of said recording medium;
   second driving means capable of moving the light spot over said recording medium for more than said limited range, said second driving means having a positioning accuracy lower than that of said first driving means;
   first detecting means for detecting a displacement of the light spot moved by said first driving means, and for outputting a displacement detection signal;
   second detecting means for detecting a relative velocity between the track and the light spot, and for outputting a relative velocity detection signal;
   first drive signal outputting means for forming a drive signal for driving said first driving means based on a high-frequency signal component extracted from said displacement detection signal and a low-frequency signal component extracted from said relative velocity detection signal; and
   second drive signal outputting means for forming a drive signal for driving said second driving means in accordance with at least said displacement detection signal.

8. An apparatus according to claim 7, wherein said second detecting means comprises error detecting means for detecting a tracking error from said reproduction signal and outputting a tracking error signal, and means for detecting the relative velocity from the tracking error signal and outputting the relative velocity detection signal.

9. An apparatus according to claim 7, wherein said second drive signal outputting means comprises target value generating means for outputting a target displacement value, and means for comparing the displacement detection signal output from said first detecting means with the target displacement value and outputting an error signal as the drive signal to said second driving means.

10. An apparatus according to claim 9, wherein said second drive signal outputting means includes phase compensating means for phase-compensating the error signal.

11. An apparatus according to claim 7, wherein said first drive signal outputting means comprises means for converting the displacement detection signal into a velocity signal, filter means for extracting a high-frequency component from the velocity signal, another filter means for extracting a low-frequency signal component from the relative velocity detection signal, adder means for adding the high- and low-frequency signal components and outputting a pseudo relative velocity signal, target velocity value outputting means for outputting a target velocity value, and means for forming the first drive signal based on a difference signal between the pseudo relative velocity signal and the target velocity value.

12. An apparatus according to claim 11, wherein said first drive signal outputting means has a gain compensating circuit for processing the difference signal to improve a servo loop.

13. An apparatus according to claim 7, wherein said second drive signal outputting means extracts a low-frequency signal component from the first drive signal output from said first drive signal outputting means, and outputs the signal component to said second driving means as a second drive signal.

14. An information recording/reproducing apparatus comprising:
optical head means for projecting a light spot onto a recording medium having a track;
first actuator means for moving the light spot within a small range of said recording medium;
second actuator means for moving the light spot over a wide range of said recording medium in a direction to cross the track;
velocity indicating means for outputting a target velocity signal corresponding to a target velocity upon access;
velocity detecting means for detecting a moving velocity of the light spot upon access and outputting a moving velocity signal;
error detecting means for detecting an error between the target velocity and the moving velocity respectively obtained by said velocity indicating means and said velocity detecting means and outputting an error signal;
correction signal outputting means for removing at least a DC signal component from the target velocity signal output from said velocity indicating means and outputting a correction signal; and
drive signal outputting means for adding the error signal and the correction signal and outputting a sum signal to said second actuator means as a drive signal for driving said second actuator means.

15. An apparatus according to claim 14, further comprising track detecting means for detecting tracks which are crossed by the light spot and outputting a track signal, and wherein said velocity indicating means comprises means for calculating the number of remaining tracks to a target track in response to the track signal, and means for outputting the target velocity signal according to the number of remaining tracks.

16. An apparatus according to claim 14, wherein said drive signal outputting means comprises adder means for directly adding the error signal and the correction signal and outputting a sum signal, and means for amplifying the sum signal with a predetermined gain.

17. An apparatus according to claim 14, wherein said correction signal outputting means comprises a filter having a predetermined transfer function.

18. An apparatus according to claim 14, wherein said correction signal outputting means comprises a voltage-controlled amplifier.

19. An information recording/reproducing apparatus comprising:
optical head means for projecting a light spot onto a recording medium having a track;
first actuator means for moving the light spot within a small range of said recording medium;
second actuator means for moving the light spot over a wide range of said recording medium in a direction to cross the track;
velocity indicating means for outputting a target velocity signal corresponding to a target velocity upon access;
velocity detecting means for detecting a moving velocity of the light spot upon access and outputting a moving velocity signal;
error detecting means for detecting a difference between the target velocity and the moving velocity which are obtained by said velocity indicating means and said velocity detecting means, respectively, and outputting an error signal;
converting means for converting the error signal output from said error detecting means into a drive signal for driving said first actuator means;
first actuator position detecting means for detecting movement of said first actuator means driven by the drive signal corresponding to the error signal and outputting a position signal;
correction signal outputting means for removing at least a DC signal component from the target velocity signal output from said velocity indicating means and outputting a correction signal; and
adder means for adding the correction signal and the position signal and outputting a sum signal; and
amplifier means for amplifying the sum signal with a predetermined gain, and outputting an amplified signal to said second actuator means as a drive signal for driving said actuator means.

20. An information recording/reproducing apparatus comprising:
optical head means for projecting a light spot onto a recording medium having a track;
first actuator means for moving the light spot within a small range of said recording medium;

second actuator means for moving the light spot over a wide range of said recording medium in a direction to cross the track;

velocity indicating means for outputting a target velocity signal corresponding to a target velocity upon access;

velocity detecting means for detecting a moving velocity of the light spot upon access and outputting a moving velocity signal;

error detecting means for detecting a difference between the target velocity and the moving velocity which are obtained by said velocity indicating means and said velocity detecting means, respectively, and outputting an error signal;

converting means for converting the error signal output from said error detecting means into a drive signal for driving said first actuator means;

correction signal outputting means for removing at least a DC signal component from the target velocity signal output from said velocity indicating means and outputting a correction signal; and drive signal outputting means for adding the correction signal and the drive signal for said first actuator means and outputting a drive signal for driving said second actuator means.

* * * * *